(12) United States Patent
Iida

(10) Patent No.: US 9,150,101 B2
(45) Date of Patent: Oct. 6, 2015

(54) FUEL-CELL VEHICLE

(71) Applicant: SUZUKI MOTOR CORPORATION, Shizuoka-Ken (JP)

(72) Inventor: Kazuhiro Iida, Shizuoka-Ken (JP)

(73) Assignee: SUZUKI MOTOR CORPORATION, Hamamatsu-shi, Shizuoka-ken (JP)

(*) Notice: Subject to any disclaimer, the term of this patent is extended or adjusted under 35 U.S.C. 154(b) by 0 days.

(21) Appl. No.: 14/290,284

(22) Filed: May 29, 2014

(65) Prior Publication Data

US 2014/0353061 A1     Dec. 4, 2014

(30) Foreign Application Priority Data

Jun. 4, 2013   (JP) .................................. 2013-118197

(51) Int. Cl.
*B60K 8/00*      (2006.01)
*B60K 15/07*     (2006.01)
*B62K 11/04*     (2006.01)
*B62J 35/00*     (2006.01)
*B60K 15/03*     (2006.01)

(52) U.S. Cl.
CPC ................. *B60K 15/07* (2013.01); *B62J 35/00* (2013.01); *B62K 11/04* (2013.01); *B60K 2015/03315* (2013.01); *B62K 2204/00* (2013.01)

(58) Field of Classification Search
CPC ........... B60K 2202/00; B60K 2204/00; B60K 19/30; B60L 11/1896; H01M 2250/20
USPC ............................. 180/65.1, 65.31, 219, 220
See application file for complete search history.

(56) References Cited

U.S. PATENT DOCUMENTS

2008/0093148 A1*   4/2008   Takahashi ..................... 180/220
2009/0020347 A1*   1/2009   Horii et al. ................... 180/65.3

FOREIGN PATENT DOCUMENTS

JP          2005047482 A      2/2005
JP          2010235071 A      10/2010

* cited by examiner

*Primary Examiner* — Hau Phan
*Assistant Examiner* — Bryan Evans
(74) *Attorney, Agent, or Firm* — Barnes & Thornburg LLP

(57) ABSTRACT

A fuel-cell vehicle includes a vehicle body provided with a vehicle body frame, a fuel cell that is disposed in an inside space of a vehicle body frame and generates electric power using hydrogen as fuel, a fuel tank including a tank main body storing hydrogen fuel to be supplied to the fuel cell and a tank valve, an engine that generates a drive force for a vehicle with the electric power from the fuel cell, and at least one casing that accommodates a required vehicle component and is formed into a box shape with high rigidity.

5 Claims, 11 Drawing Sheets

FUEL-CELL VEHICLE

PRIORITY CLAIM

This patent application claims priority to Japanese Patent Application No. 2012-118197, filed 4 Jun. 2013, the disclosure of which is incorporated herein by reference in its entirety.

BACKGROUND OF THE INVENTION

1. Field of the Invention

The present invention relates to a vehicle driven by fuel-cell or battery including a fuel cell that generates electric power with use of hydrogen as fuel, that is called hereinafter "fuel-cell vehicle" for the sake of convenience.

2. Description of the Related Art

A fuel-cell vehicle is equipped with a fuel-cell system. In the fuel-cell system, a fuel gas such as a hydrogen gas and a reaction gas such as air are supplied to a fuel cell, in which electrochemical reaction is caused to thereby generate an electric power.

The electric power generated by the fuel cell system is supplied to a motor, and when the motor is driven, a wheel (wheels) is driven via a power transmission mechanism.

The fuel-cell vehicle of this kind includes a fuel-cell two-wheeled vehicle such as motorcycle and a tricycle in which a fuel cell system formed by a fuel cell and a fuel tank is mounted on a vehicle body frame (see Patent Document 1: Japanese Patent Laid-Open publication No. 2010-235071) and Patent Document 2: Japanese Patent Laid-Open Publication No. 2005-47482).

The invention described in Patent Document 1 is the fuel-cell vehicle in which a pair of left and right fuel tanks are equipped so as to be exposed to the upper portions on both sides in the front side of a vehicle body frame, and a radiator is disposed so as to protrude on both sides of a fuel cell that is provided in a central portion of the vehicle body frame.

However, the radiator does not have sufficient mechanical and physical strength, and therefore, does not always provide a sufficient function of protecting the fuel cell at the time of falling down. In addition, the fuel tank is exposed on both sides at the upper portion of the front of the vehicle body frame, and therefore, the fuel tank is liable to be easily damaged at the time of falling down.

Furthermore, in the fuel-cell two-wheeled vehicle (called "motorcycle" hereinafter) described in Patent Document 2, a fuel cell and a fuel tank are mounted on the lower portion of the front of a vehicle body, and in such mounting structure, the fuel cell and the valve of the fuel tank as precision instruments need to be protected from scattered stones during traveling and impact at the time of falling down. In order to protect the fuel cell and the valve of the fuel tank, it is necessary for the cover member covering the vehicle body lower portion to be made large and strong with high rigidity, thus providing a problem leading to increase in the vehicle weight of a fuel-cell motorcycle.

SUMMARY OF THE INVENTION

The present invention was conceived in consideration of the circumstances mentioned above, and an object thereof is to provide a fuel-cell vehicle capable of improving a protection function of precision instruments such as a fuel cell and a fuel tank and enhancing stability and controllability by improving frame rigidity.

The above and other objects can be achieved according to the present invention by providing a fuel-cell vehicle which includes a vehicle body provided with a vehicle body frame, a fuel cell that is disposed in an inside space of a vehicle body frame and generates electric power using hydrogen as fuel, a fuel tank including a tank main body storing hydrogen fuel to be supplied to the fuel cell and a tank valve, an engine that generates a drive force for a vehicle with the electric power from the fuel cell, and at least one (for example, two in the present embodiment) casing that accommodates a required vehicle component and is formed into a box shape with high rigidity, wherein the casing is provided in a vehicle body front side of the fuel cell and the fuel tank in a side view of the vehicle body, and, in a front view of the vehicle body, the casing is configured so that an outside end profile of the casing located at an outermost side in a vehicle body width direction in each of left and right portions of the casing protrudes outward in the vehicle body width direction from both outer side profiles in the vehicle body width direction of the fuel cell and, in a front view of the vehicle body, the casing is overlaid on the fuel cell or the fuel tank.

According to the present invention of the features mentioned above, the fuel cell and the fuel tank disposed in the inside space of the vehicle body frame can be protected by the casing(s) with high rigidity. Moreover, the rigidity of the frame can be improved, and stability and controllability of the fuel-cell vehicle can be also enhanced.

The nature and further characteristic features of the present invention will be made more clear from the following descriptions made with reference to the accompanying drawings.

DESCRIPTION OF THE PREFERRED EMBODIMENT

An embodiment of a fuel-cell vehicle according to the present invention will be described hereunder with reference to the accompanying drawings. Further, it is to be noted that terms of "front and rear", "upper and lower", and "left and right" indicating direction or like are used herein based on the illustrated state or on a state in which a rider who rides on a fuel-cell motorcycle 10.

Figure 1:
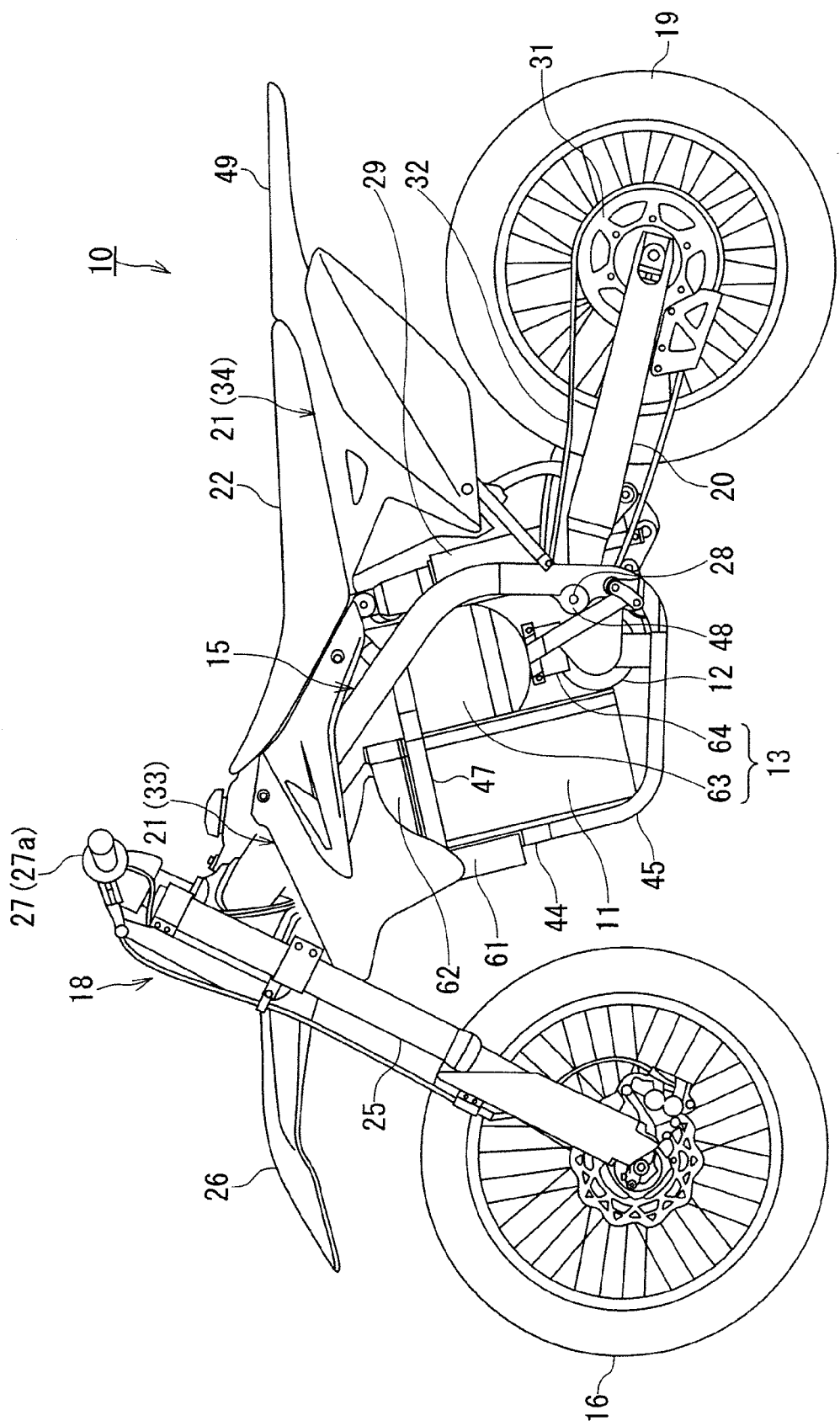
FIG. 1 is a left side view showing an entire configuration of a two-wheeled fuel-cell vehicle (hereinafter, fuel-cell motorcycle) as an embodiment of a fuel-cell vehicle according to the present invention.

As shown in FIG. 1, the fuel-cell motorcycle (vehicle) 10 travels by a power engine (prime mover) 12 as a drive motor that generates a drive force for a vehicle with electric power supplied from a fuel cell 11. The fuel-cell motorcycle 10 is, for example, a motorcycle suitable for travelling on rough terrain and is specifically suitable for an off-road vehicle such as a dual-purpose motorcycle and a motocross bike.

The fuel cell 11 is a power generation device that generates electric power through electrochemical reaction of air (reaction gas) containing oxygen as an oxidizer with a hydrogen gas as fuel supplied from a fuel tank 13, and this power generation system also constitutes an air-cooling type fuel cell system.

In addition to the fuel cell 11, the power engine 12 and the fuel tank 13, the fuel-cell motorcycle 10 further includes a vehicle body frame 15 that extends longitudinally of the vehicle body, a front wheel 16 as a steering wheel disposed in front of the vehicle body frame 15, a steering mechanism 18 that is disposed at a front of the vehicle body frame 15 and rotatably supports the front wheel 16, a rear wheel 19 as a drive wheel that is disposed behind the vehicle body frame 15, a swing arm 20 that extends rearward of the vehicle body frame 15 and rotatably supports the rear wheel 19, an exterior component 21 partially covering the vehicle body frame 15, and a driver's seat 22 that is provided at the vehicle body frame 15 and allows a passenger to be seated thereon.

The vehicle body frame 15 is of a frame structure of a semi-double cradle type of the fuel-cell motorcycle 10, which supports the fuel cell 11 and the power engine 12, and in which the fuel cell 11 and the power engine 12 are accommodated in an inside space of the vehicle body frame 15.

The steering mechanism 18 includes a pair of left and right front forks 25 provided therein with a suspension mechanism (not shown) so as to support the front wheel 16 rotatably, a front fender 26 covering over a top portion of the front wheel 16, and a handle 27 connected to top portions of the front forks 25. The rider steers the front wheel 16 in a lateral direction of the vehicle by operating the handle 27 to turn the vehicle. The handle 27 at a right side of the vehicle functions as an accelerator grip 27a.

The pair of left and right front forks 25 includes a telescopic structure that elastically expands and contracts, and supports the front fender 26 that covers over the top of the front wheel 16.

At the vehicle body frame 15, the swing arm 20 swingably supports the rear wheel 19 in the vertical direction with a pivot shaft 28 as a center. A rear cushion unit 29 is interposed between the swing arm 20 and the vehicle body frame 15 to cushion a force that is transmitted from the rear wheel 19 to the vehicle body frame 15.

The rear wheel 19 includes a driven sprocket 31. A drive chain 32 is wound around a drive sprocket (not shown) provided at an output shaft of the prime mover 12 and the driven sprocket 31 to constitute a power transmission mechanism, and the drive chain 32 transmits a drive force to the rear wheel 19 from the power engine 12 as a drive motor.

Further, the fuel-cell motorcycle 10 includes a side cover 33 covering left and right portions of a space above the fuel cell 11, and a frame cover 34 covering left and right portions of a space under the driver's seat 22.

Next, the vehicle body frame 15 of the fuel-cell motorcycle 10 will be described with reference to FIGS. 2 to 6.

As shown in FIGS. 2 to 6, the vehicle body frame 15 of the fuel-cell motorcycle 10 according to the present embodiment includes a head pipe 41, a pair of left and right main frames 42, a pair of left and right center frames 43, a down tube 44, a pair of left and right lower tubes 45 constituting a double cradle section, a bridge member 46 and a pair of left and right cross members 47.

The head pipe 41 is disposed at a top portion on the front side of the vehicle body frame 15. The head pipe 41 supports the steering mechanism 18 to be turnable in the lateral direction.

Figure 3:
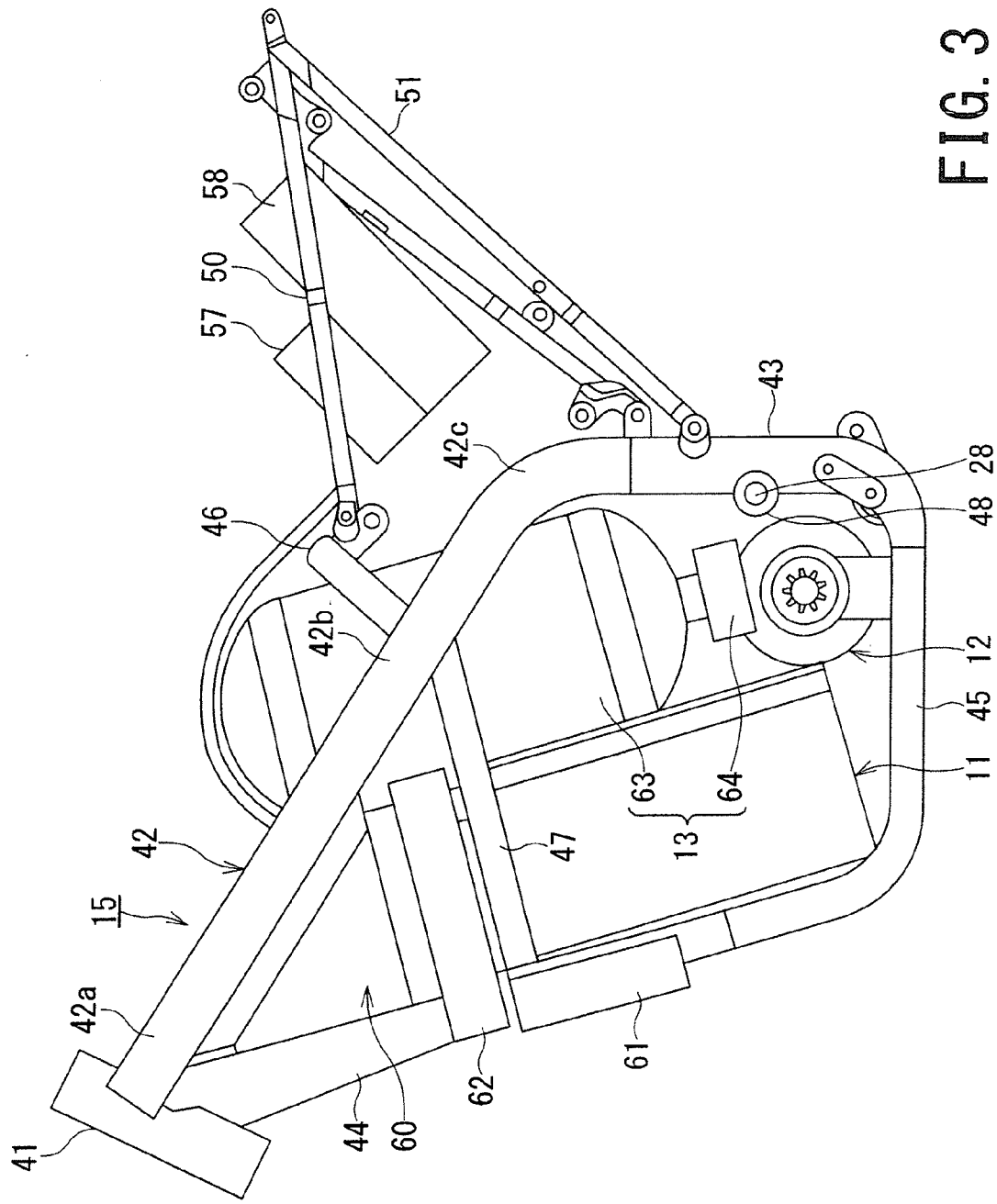
FIG. 3 is a left side view showing a layout relationship between the vehicle body frame and the on-board components such as the fuel-cell system similarly to FIG. 2.

As shown in FIG. 3, the paired left and right main frames 42 include front end portions 42a that are connected to the head pipe 41, intermediate portions 42b expanding laterally from the front end portions 42a and extending downward to a rear side, and rear end portions 42c that are bent downward. The intermediate portion 42b extends while inclining diagonally downward from the front end portion 42a to the rear end portion 42c.

Further, it is to be noted that although the paired left and right main frames 42 have respectively one frame on each of the left and right sides so as to constitute a tank frame, the each of the main frames 42 may have a plurality of frames on the left and right sides. For example, the respective left and right frames may have structure branching and extending in upper and lower directions.

The pair of left and right center frames 43 are joined to lower ends of the respective rear end portions 42c thereof. The pair of left and right center frames 43 integrally include pivot brackets 48, which swingably supports the swing arm 20 via the pivot shaft 28.

The down tube 44 is connected to the head pipe 41 and extends downward.

The pair of left and right lower tubes 45 are connected to a lower end of the down tube 44, and branched therefrom so as to extend downward from the respective branched end portions. The extended branched end portions are then bend rearward to further extend in a horizontal direction while constituting a lower end portion of the entire vehicle body frame 15, and are connected to respective lower end portions of the center frames 43. In this manner, the vehicle body frame 15 is formed into a semi-double cradle structure.

The bridge member 46 is bridged between the pair of left and right main frames 42 so thereby swingably support an upper end of the rear cushion unit 29.

The pair of left and right cross members 47 are connected to the pair of left and right main frames 42, respectively, from the down tube 44 so as to reinforce both side portions of the vehicle body frame 15.

In addition, the vehicle body frame 15 of the fuel-cell motorcycle 10 includes a pair of left and right seat rails 50 that extend upward to the rear side from the pair of left and right main frames 42 (or the bridge member 46), and a pair of left and right seat pillar tubes 51 that extend upward to the rear from the center frames 43. Rear end portions of the seat rails 50 and the seat pillar tubes 51 are joined to one another for reinforcement.

The pair of left and right seat rails 50 extend to the rear side from front end portions that are detachably fixed to the respective pair of left and right main frames 42 so as to support the driver's seat 22. The pair of left and right seat rails 50 extend to the rear side of the driver's seat 22 to support the rear fender 49 that is laid over the top of the rear wheel 19.

Figure 6:
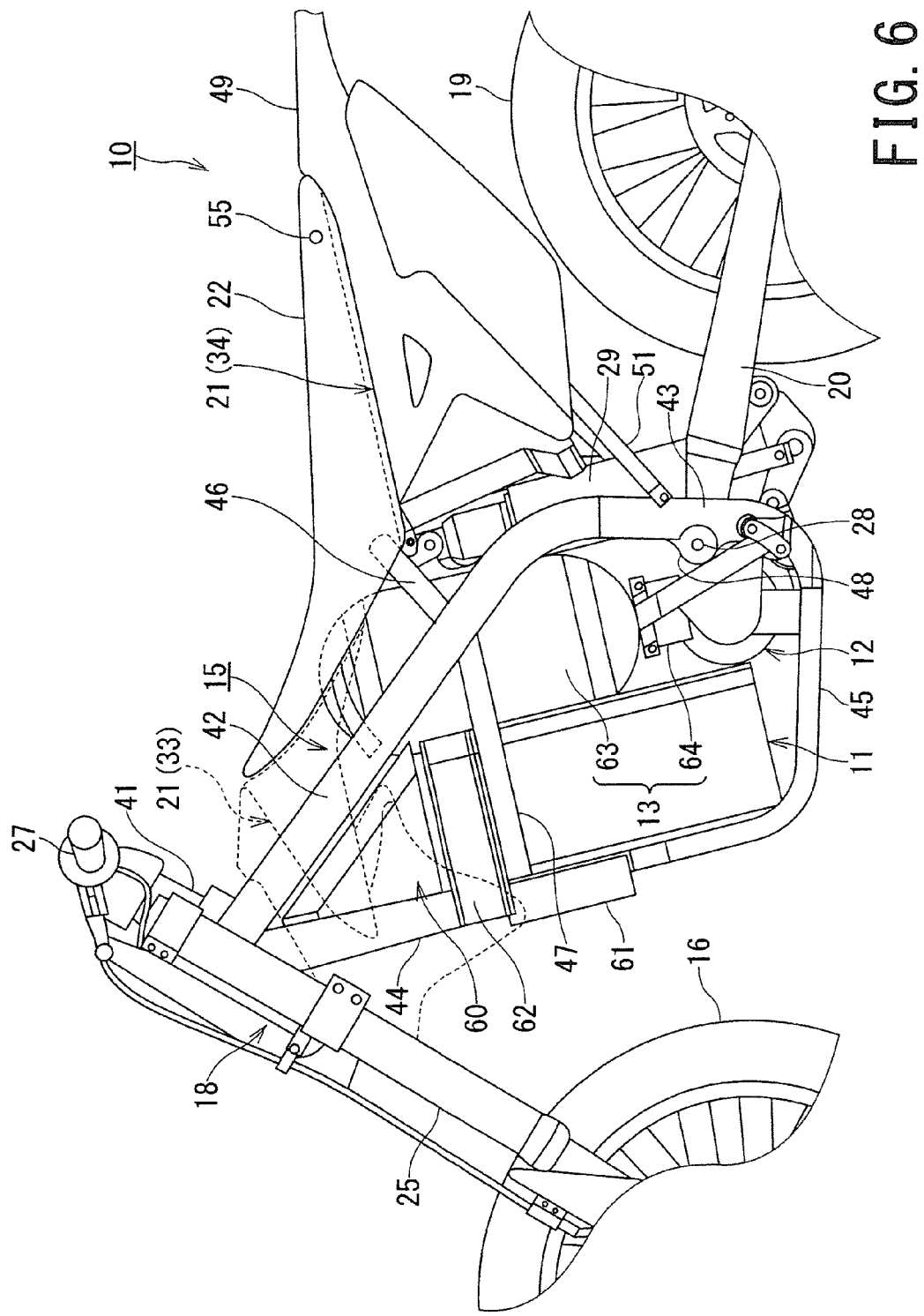
FIG. 6 is a left side view of the fuel-cell motorcycle seen from a left side.
Figure 7:
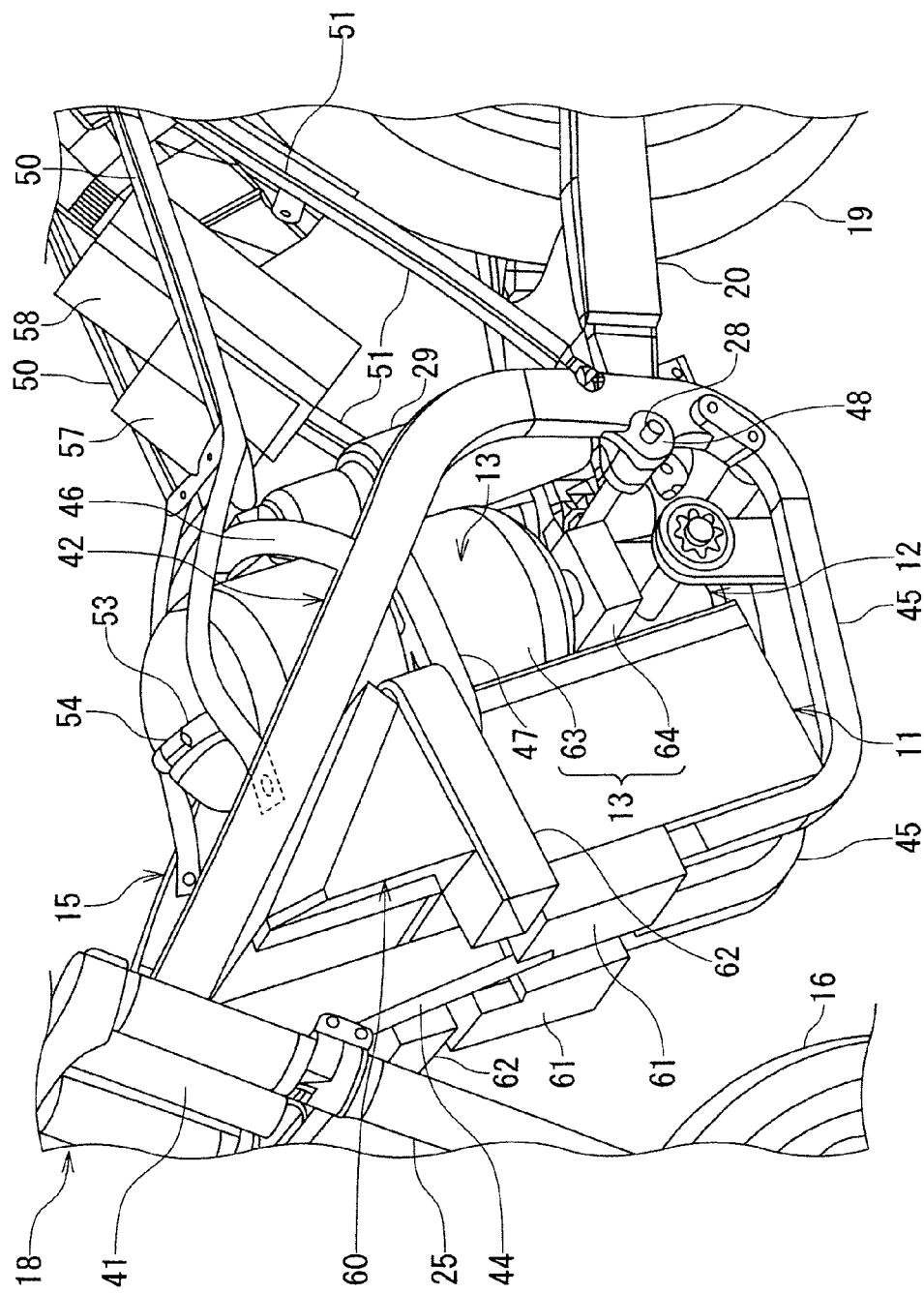
FIG. 7 is a perspective view of the fuel-cell motorcycle seen from a left side of a front of the vehicle.
Figure 8:
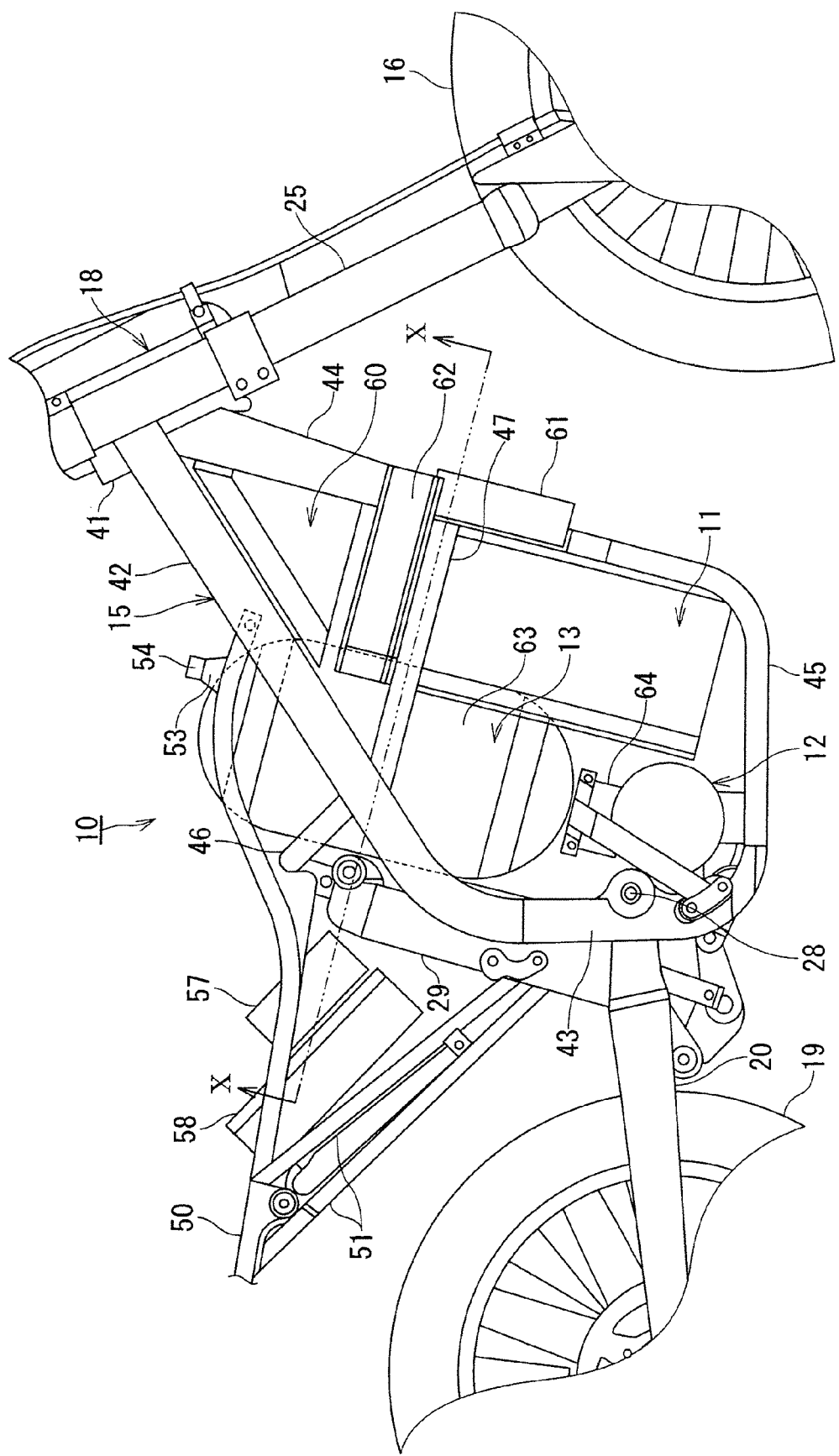
FIG. 8 is a right side view of the fuel-cell motorcycle seen from a right side.

As shown in FIGS. 6, 7 and 8, the pair of left and right seat rails 50 include a seat rail bridge section 53 that is connected to the main frames 42 and connect the pair of left and right seat rails 50, at the front end portions of the pair of left and right seat rails 50, a seat hinge 54 provided at the seat rail bridge section 53 to swingably support the driver's seat 22, a seat lock 55 disposed at rear end portions of the pair of left and right seat rails 50 to detachably hook the driver's seat 22.

In the fuel-cell motorcycle 10, the seat rail bridge section 53 for fixing the driver's seat 22, the seat hinge 54 and the seat lock 55 are provided concentrically at the pair of left and right seat rails 50, whereby positional displacement at a time of assembling and opening/closing the driver's seat 22 can be restrained, thus improving the convenience as compared with the case in which the seat rail bridge section 53, the seat hinge 54 and the seat lock 55 are disposed in a manner distributed to the main frames 42 and the seat rails 50.

The vehicle body frame 15 is mounted with a motor controller 57 and an inverter 58 in a region sandwiched by the pair of left and right seat rails 50 and the seat pillar tubes 51. More specifically, in the vehicle body frame 15, the motor controller 57 is disposed on a front side and the inverter 58 is disposed on a rear side thereof. The motor controller 57 and the inverter 58 are supported by being sandwiched with the pair of left and right seat rails 50.

As shown in FIGS. 6 to 8, the vehicle body frame 15 is mounted with the fuel cell 11, the engine 12 as a drive motor, the fuel tank 13, a secondary cell 60 as a battery and the like in a region (hereinafter, the region will be described as an inside space of the vehicle body frame 15) surrounded by the pair of left and right main frames 42, the pair of left and right center frames 43, the down tube 44, the pair of left and right lower tubes 45, the bridge member 46 and the pair of left and right cross members 47.

The fuel cell 11 is disposed along the down tube 44 on the rear side of the down tube 44, and the fuel tank 13 is disposed at an upper portion of the rear side of the fuel cell 11. The fuel cell 11 and the fuel tank 13 are provided in such a manner that longitudinal directions thereof are in a substantially vertical state. A positional relationship between the fuel cell 11 and the fuel tank 13 in arrangement into the inside space of the vehicle body frame 15 may be inversed in the vehicle body longitudinal direction, and the fuel tank 13 may be disposed directly behind the down tube 44.

More specifically, in the vehicle body frame 15, the secondary cell 60 as the battery is mounted in a vicinity of an upper half portion of the down tube 44 of the semi-double cradle structure that is the inside space of the vehicle body frame 15, and under the secondary cell 60, the fuel cell 11 is mounted in a region from a vicinity of a lower half portion of the down tube 44 to a vicinity of a hanging portion of the lower tube 45 that constitutes a double cradle section.

The fuel tank 13 is mounted behind the secondary cell 60 and the fuel cell 11. The fuel cell system is composed of the fuel cell 11 and the fuel tank 13. The secondary cell 60 is disposed close to the head pipe 41, thereby achieving reduction of a junction cable, not illustrated, and improving the maintainability for electrical and electronic parts such as a meter that are provided concentrically in the vicinity of the handle 27.

Furthermore, the power engine 12 as drive motor is mounted under the fuel tank 13 and at the rear end portion of the lower tube 45 and in the vicinity of the center frame 43. The secondary cell 60 is located on a pair of left and right intake ducts 62 for guiding cooling air. The fuel tank 13 is composed of a tank main body 63 for storing hydrogen fuel and a tank valve 64 as a supply valve for supplying the fuel of a hydrogen gas stored to the fuel cell 11.

Furthermore, a pair of left and right casings 61 are provided for the vehicle body frame 15 above of the branched portions of the lower tubes 45 on both sides of the lower half portion of the down tube 44. The pair of left and right casings 61 are formed each into a box shape from a metallic material or a rigid resin material having high rigidity. For example, the casing 61 may be formed of an aluminum case or the like having a light-weight structure, and having high rigidity and large mechanical/physical strength.

A pair of left and right casings 61 are provided at the down tube 44 closely in front of the fuel cell 11 at a vehicle body front side, or the casing 61 is provided on an outer side of either one of the left and the right sides of the down tube 44. The fuel cell 11 is formed into a box shape and disposed on the rear side of the down tube 44 along the down tube 44. The casing 61 accommodates stored components such as a vehicle controller, and side profiles A of outer side surfaces in the vehicle body width direction of the pair of left and right casings 61 protrude outward in the vehicle body width direction over side profiles B of the fuel cell 11 on both side surfaces in the vehicle body width direction in the upper half portion of the fuel cell 11 as shown in FIGS. 5 and 9.

The vehicle body front side and the vehicle body bottom side of the lower half portion of the fuel cell 11 are covered with the lower tubes 45 in the double cradle section of the vehicle body frame 15. Both outer side ends in the vehicle body width direction of the lower tubes 45 in the double cradle section protrude outward in the vehicle body width direction from both the outer side ends in the vehicle body width direction of the lower half portion of the fuel cell 11.

Figure 5:
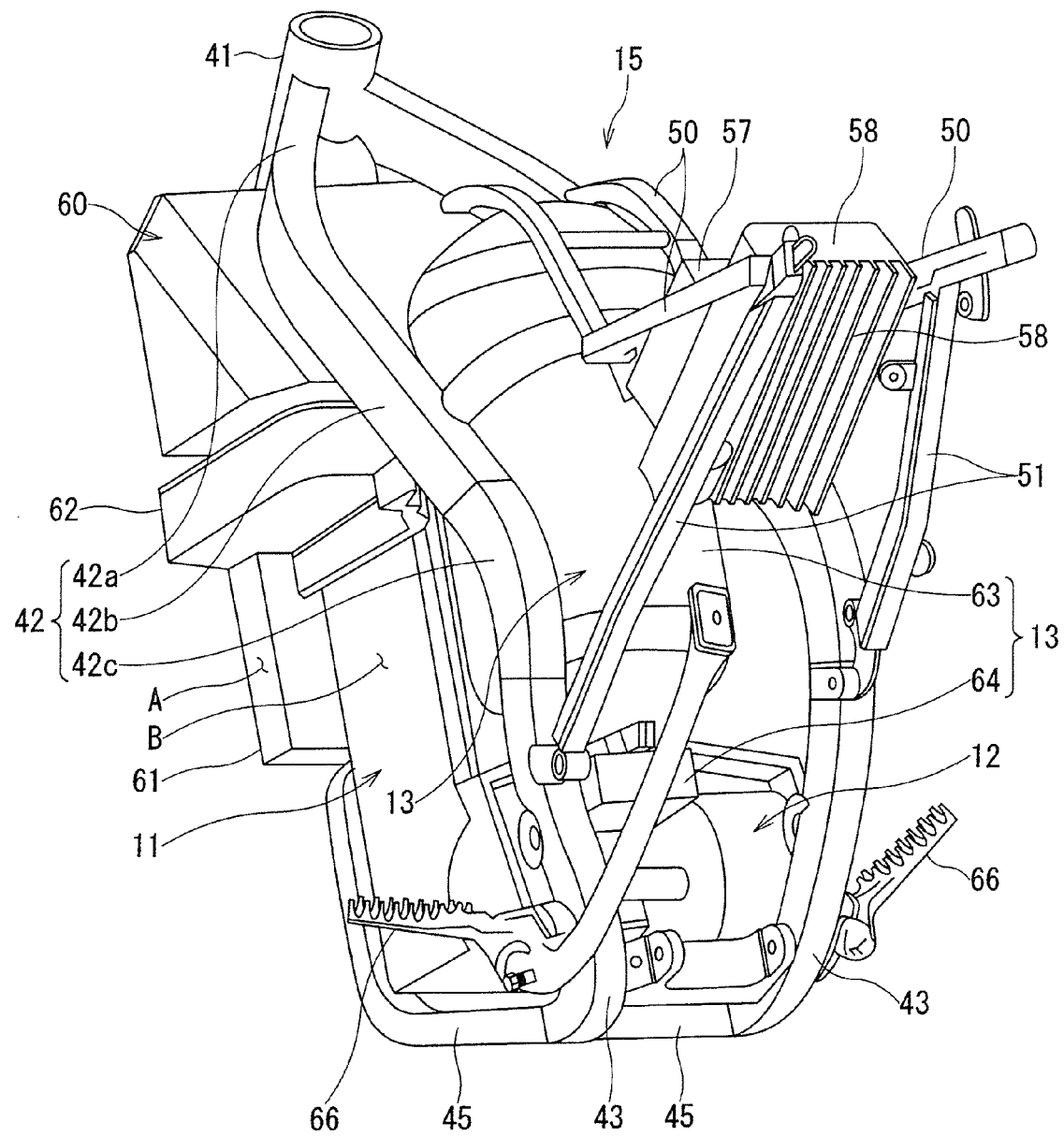
FIG. 5 is a perspective view showing a layout relationship between the vehicle body frame and the onboard components when the fuel-cell motorcycle is seen from a rear left side.
Figure 9:
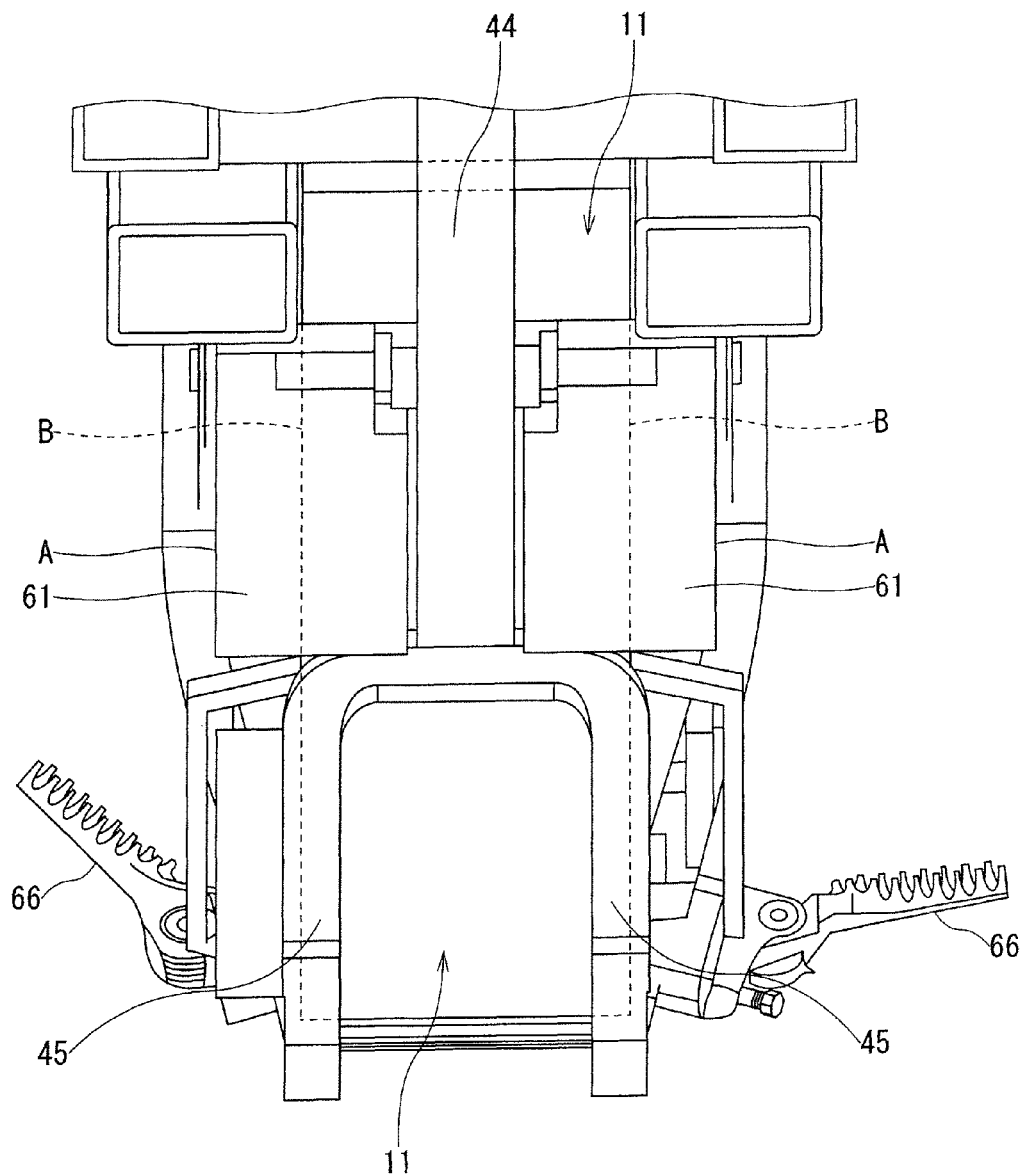
FIG. 9 is a front view of the fuel-cell motorcycle seen from the front of the vehicle with the front fork and the front wheel being removed.
Figure 10:
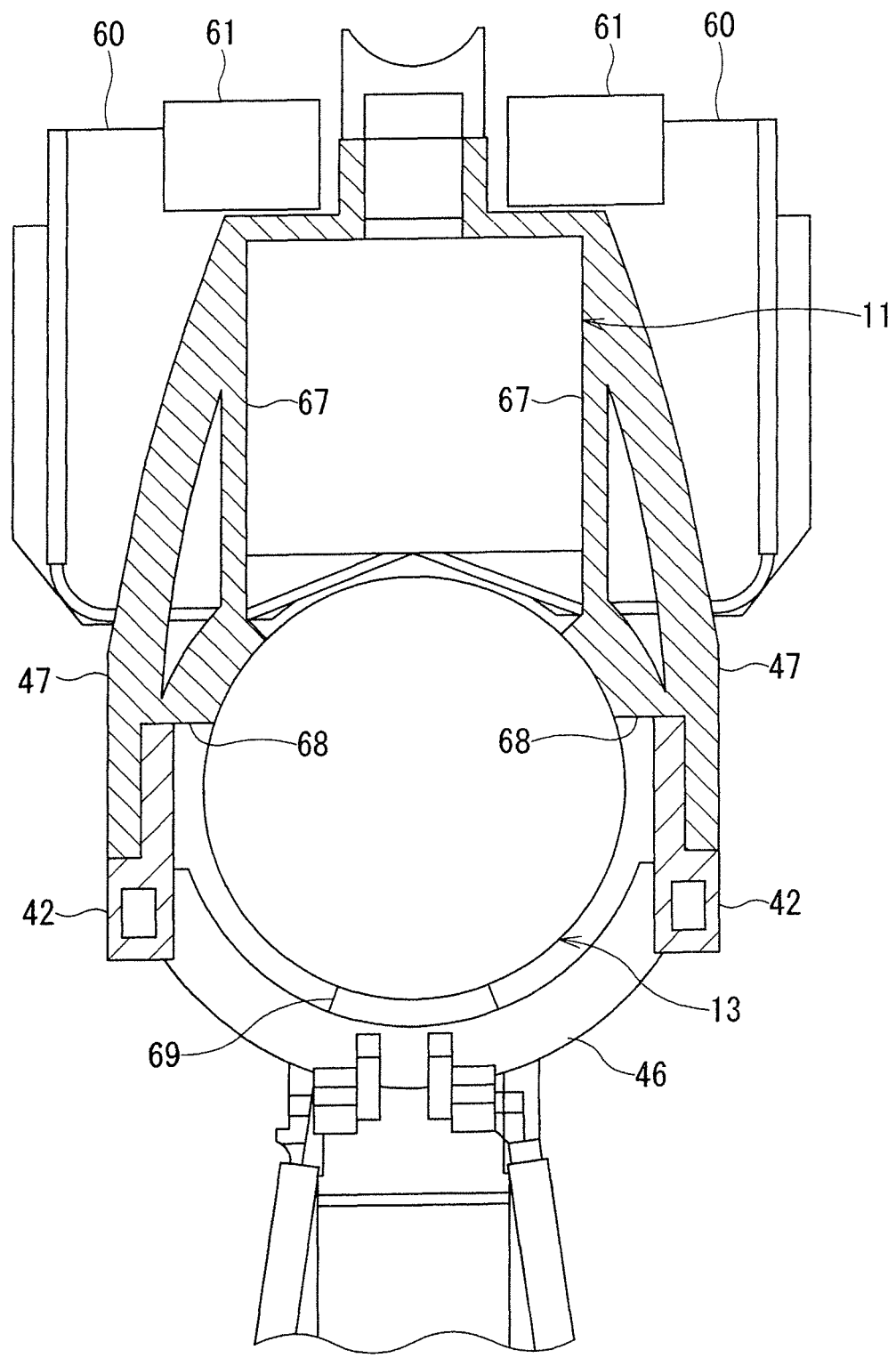
FIG. 10 is a plane cross-sectional view taken along the X-X line of FIG. 8.
Figure 11:
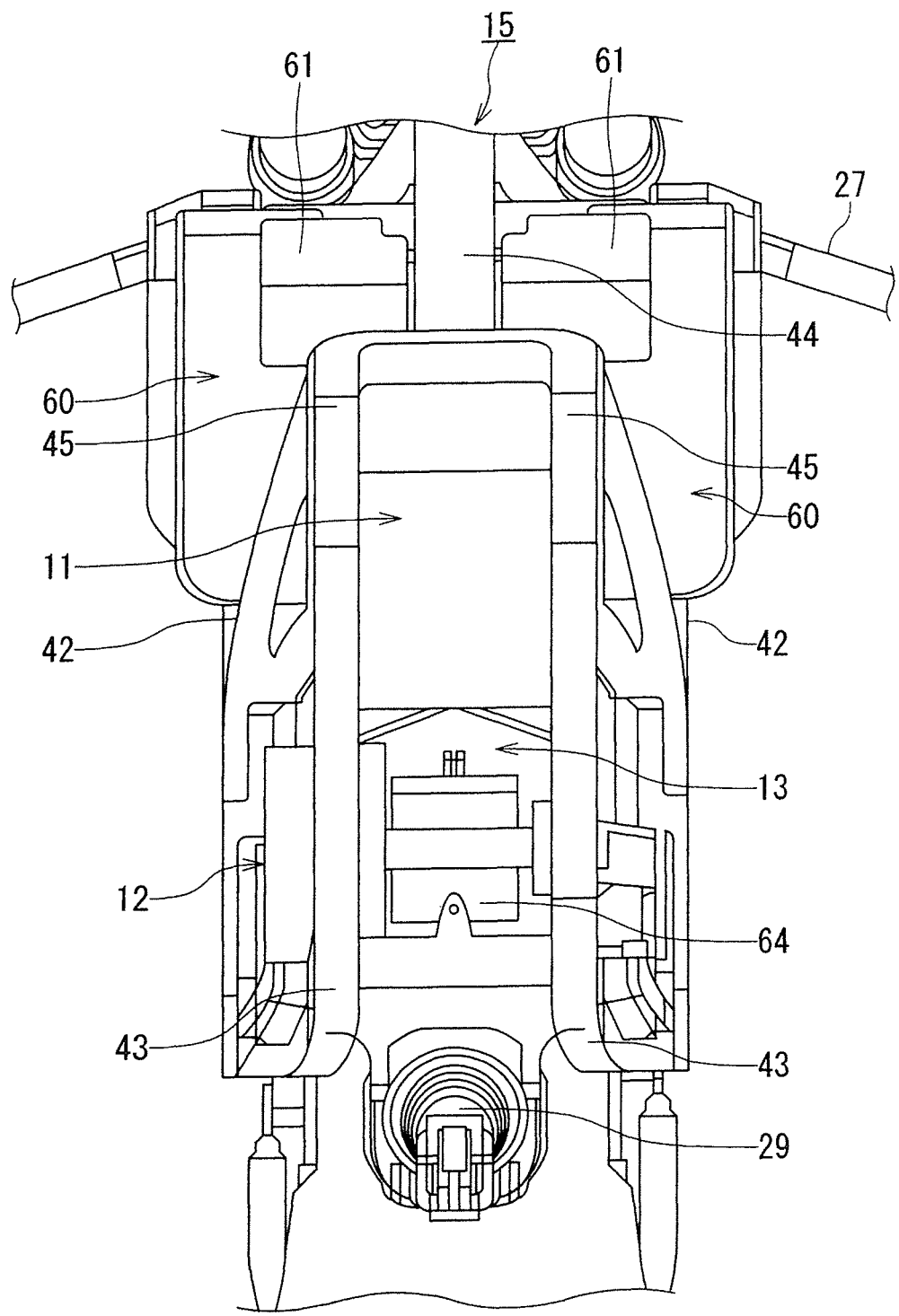
FIG. 11 is a bottom view showing a front half part of the fuel-cell motorcycle.

Further, with reference to FIGS. 5 and 9, a pair of left and right steps 66 are provided at the center frames 43 of the vehicle body frame 15 via brackets to be openable and closable.

In the fuel-cell motorcycle 10, the casings 61 having high rigidity for accommodating the stored components, such as vehicle controller, have widths in the vehicle width direction larger than the width (in the vehicle width direction) of the fuel cell 11, and the casings 61 are disposed so as to protrude outward in the vehicle body width direction. Therefore, since the casings 61 having rigidity higher than that of the fuel cell 11 of the fuel-cell motorcycle 10 projects outward in the vehicle width direction, the casings 61 first contact the ground at the time of falling down, thus preventing damage of the fuel cell 11 and the fuel tank 13 and protecting the fuel cell 11 and the fuel tank 13. The casings 61 may store a controller that controls an operation of any one of the fuel cell 11, the tank valve 64 of the fuel tank 13, the engine 12 and the other vehicle components accommodated inside the casings 61.

Furthermore, since the casings 61 have high rigidity and large mechanical/physical strength, the casings 61 are strong against the action of an external force and impact and have large impact resistance. The casings 61 are located directly in front of the fuel cell 11 on the vehicle body front side to thereby effectively protect the fuel cell 11 and enhance safety.

Furthermore, since the casings 61 are disposed in front of the fuel cell 11 and the fuel tank 13, the casings 61 receive dust and dirt and scattered stones and muddy water that fly from the front side of the vehicle at a time of traveling, thereby protecting the precision instruments and components such as the fuel cell 11, the tank valve 64 of the fuel tank 13 and the like.

Furthermore, the weight of the cover member covering the fuel cell 11 can be also reduced, and the cover member may be not necessarily required.

In addition, the pair of left and right casings 61 protrude outward in the vehicle width direction so as to extend outward from both sides of the fuel cell 11, and accordingly, the casings 61 themselves easily receive a running stream and hence improve the vehicle cooling performance. Furthermore, since a metallic material having high thermal conductivity is used for the casing 61, the heat dissipation characteristic can be improved, and even if a heat generating component such as a vehicle controller is accommodated, the cooling performance can be kept favorable. Furthermore, the casing 61 having rigidity higher than that of the fuel cell 11 is attached so as to protrude outward, so that a damage at the time of falling down from the side of the vehicle body can be eliminated, and moreover, the casing 61 first contacts the ground, thus protecting the fuel cell 11 and can effectively prevent the fuel cell 11 from damaging.

Although the front part of the upper half portion of the fuel cell 11 is covered with the pair of left and right casings 61, the casings 61 are not present at the lower half portion of the fuel cell 11. However, the lower half portion and the bottom portion of the fuel cell 11 are covered with the lower tubes 45 in the double cradle portion formed by branching the down tube 44 to the left and the right (lateral) direction, thus the lower half and bottom portions being protected. By forming the width of the outer end in the vehicle width direction of the lower tube 45 so as to provide a frame line of the vehicle body frame 15 that is larger than the width in the vehicle body width direction of the fuel cell 11, the fuel cell 11 can be protected, the vehicle body frame 15 obtains sufficient frame rigidity, and optimal controllability are be stably obtainable.

In the meantime, the pair of left and right casings 61 are disposed to be separated to the left and the right sides in the vehicle body width direction in such a manner as to avoid the vehicle body central portion, so that the damage by spattering mud, stones and the like by the front wheel 16 can be eliminated. Accordingly, the casing 61, i.e., vehicle components (stored components), can be disposed concentrically at the front of the vehicle body frame 15 to thereby improve the operability/maintainability of the fuel-cell motorcycle 10.

As shown in FIGS. 2 and 3, and FIGS. 6 and 8, the rear end portions of the paired casings 61 are positioned on the front side of the vehicle body from the rear end of the down tube 44, and accordingly, a clearance of the inside space surrounded by the vehicle body frame 15 can be on the rear side of the down tube 44 being obstructed. Therefore, the layout and arrangement of the fuel cell 11, the engine 12 and the fuel tank 13 can be smoothly performed.

For example, the vertically long fuel cell 11 and fuel tank 13 may be disposed in such a manner that the longitudinal directions thereof extend along the down tube 44, the length of the fuel-cell motorcycle 10 in the longitudinal direction of the vehicle body can be reduced. In addition, components in a superimposed arrangement can be located concentrically, and the fuel cell 11 and the fuel tank 13 can be firmly fixed to the vehicle body frame 15 such as the down tube 44 and the lower tubes 45. Furthermore, the mass of the components can be concentrated, so that the controllability can be improved.

The fuel cell 11 and the fuel tank 13 that constitute the fuel cell system are disposed in such a manner that the longitudinal directions thereof are oriented substantially in the vertical direction of the vehicle body or in the direction diagonally inclining vertically.

As shown in FIGS. 4, 5 and 9 to 11, the fuel cell 11 and the fuel tank 13 are disposed in such a manner as to be overlaid on each other in the front view of the vehicle body from the front side of the vehicle. Accordingly, the fuel cell 11 and the fuel tank 13 can be disposed concentrically in a substantially vertical state by being placed close together in the vehicle body longitudinal direction behind the casings 61.

Moreover, the fuel cell 11, the fuel tank 13 and the engine 12 as drive motor can be disposed in the inside space of the vehicle body frame 15 to be close to the rear portion of the casings 61. In addition, the fuel cell 11, the fuel tank 13 and the engine 12 are covered and protected with the paired left and right casings 61 with high rigidity and the lower tubes 45 of the double cradle section of the vehicle body frame 15. Therefore, the fuel cell 11, the fuel tank 13 and the engine 12 are covered with the casings 61 and the like and protected against scattering stones and muddy water from the front side to the fuel cell 11, the fuel tank 13 and the engine 12, thus enhancing the safeness. Further, in FIG. 10, reference numeral 67 designates an equipment support section that is formed integrally with the cross member 47, reference numeral 68 designates a tank side portion support section that is formed integrally with the cross member 47, and reference numeral 69 designates a tank rear portion support section that is formed integrally with the bridge member 46.

Figure 2:
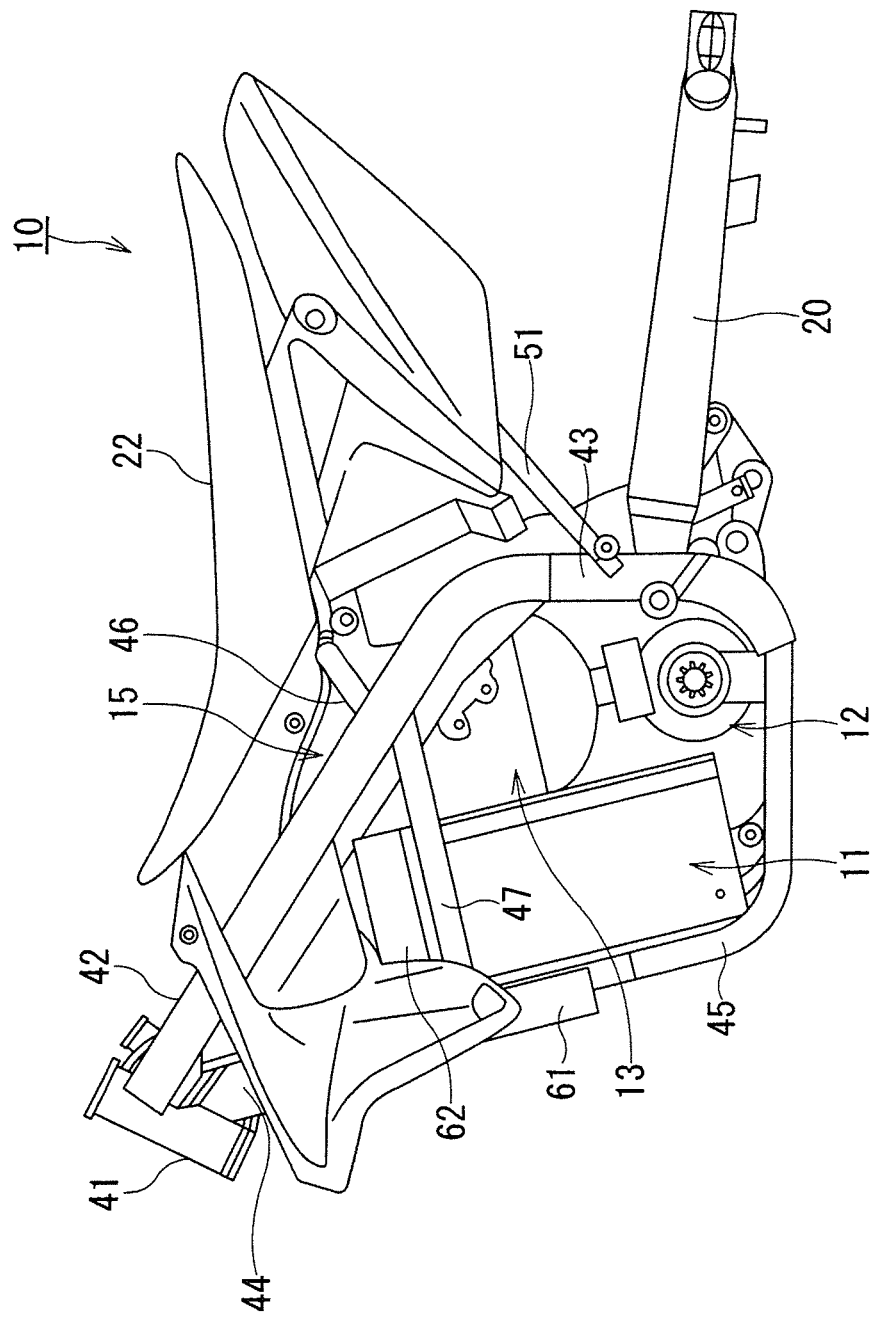
FIG. 2 is a left side view showing a layout relationship between a vehicle body frame and an on-board components such as a fuel cell system of the fuel-cell motorcycle.
Figure 4:
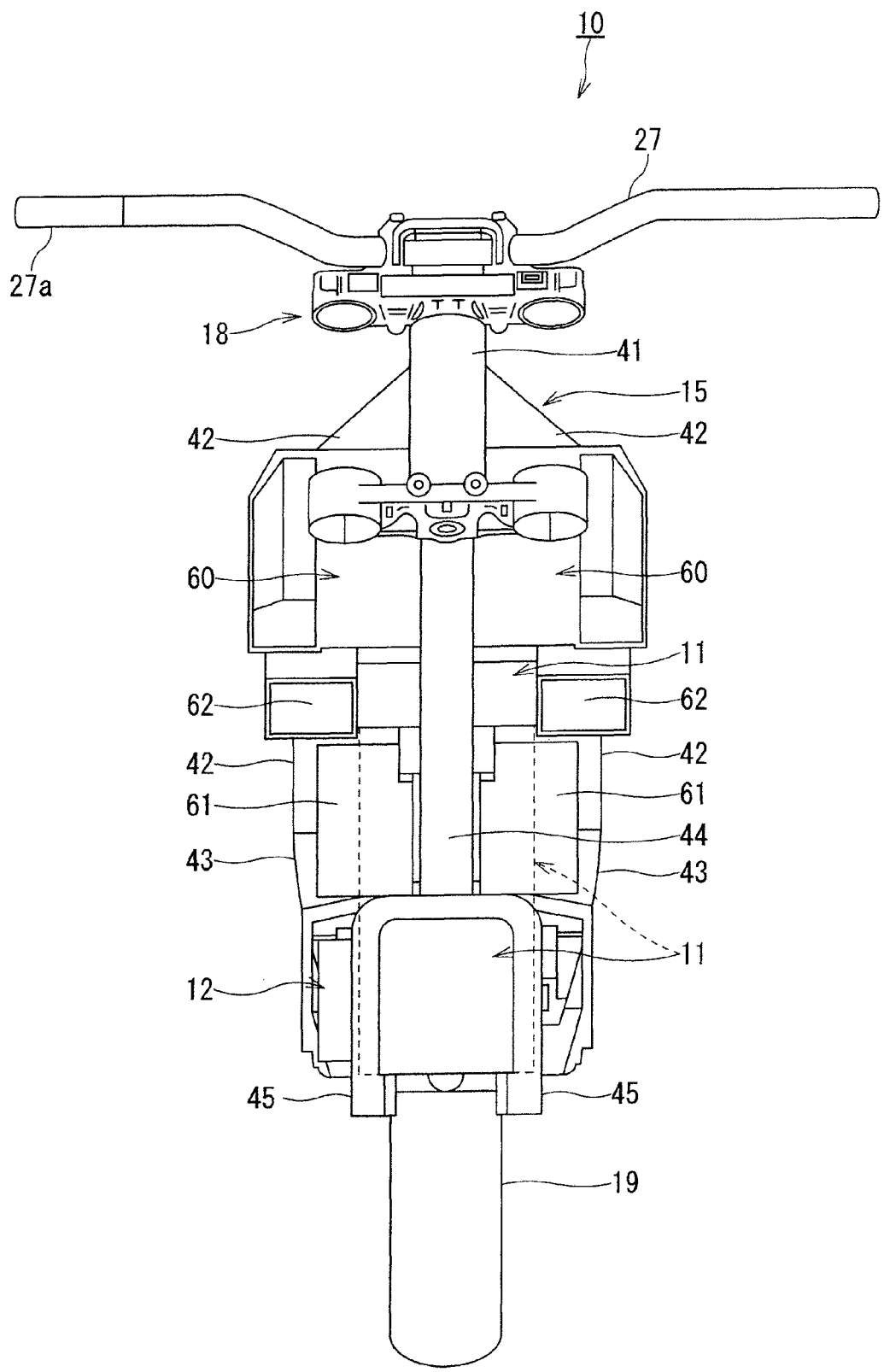
FIG. 4 is a front view seen from a vehicle front side, and shows the fuel-cell motorcycle with a front wheel and a front fork being removed.

The vehicle body frame 15 is formed into a semi-double cradle structure and includes the lower tubes 45 that have the branched portions at the lower end of the down tube 44 extending downward from the head pipe 41, and is then bent after extending downward from the branched portions of the double cradle sections that have the rear end portions joined to the lower end portions of the center frames 43. The pair of the casings 61, which are attached to the left and the right in the vehicle width direction to the down tube 44 from the head pipe 41, have the lower end portions extending to the branched portions of the lower tubes 45 and terminated there, as shown in FIGS. 2 to 4. When the lower edges of the pair of left and right casings 61 are extended to the branched portions of the lower tubes 45, the front surface of the upper half portion of the fuel cell 11 can be protected further widely.

In the embodiment of the present invention, the fuel-cell vehicle is described by illustrating the fuel-cell motorcycle as two-wheeled vehicle, and the fuel-cell vehicle may also be applied to compact vehicles such as a tricycle and a four-wheeled vehicle besides a fuel-cell motorcycle. In particular, the fuel-cell vehicle of the present invention is applicable to compact vehicles such as a fuel-cell tricycle and a four-wheeled vehicle for traveling on rough terrain which have similar vehicle body structures.

Furthermore, in the embodiment of the present invention, although the example of adopting the semi-double cradle structure in the vehicle body frame of the fuel-cell motorcycle is shown, in a structure in which the controller accommodated in the casing can be made compact and the layout configuration allow the following structure, that is, the down tube is divided into two sections directly under the head pipe to be formed into a double cradle structure, and the top to the bottom of the fuel cell can be protected by the two left and right down tube sections of the double cradle structure. In this case, the casing accommodating the compact controller may be disposed between the two frames of the down tube formed into a double cradle.

What is claimed is:
1. A fuel-cell vehicle comprising:
a vehicle body provided with a vehicle body frame;
a fuel cell that is disposed in an inside space of the vehicle body frame and generates electric power using hydrogen as fuel;
a fuel tank arranged on a rear upper portion of the fuel cell and including a tank main body storing hydrogen fuel to be supplied to the fuel cell and a tank valve;
an engine that generates a drive force for a vehicle with the electric power from the fuel cell; and
at least one casing that accommodates a required vehicle component, and is formed into a box shape with high rigidity, wherein the vehicle body frame includes a down tube, a pair of main frames and a pair of center frames, in which the down tube is connected to a head pipe so as to extend downward therefrom, the main frames are connected to the head pipe and then are widened laterally so as to extend therefrom rearward and bent downward, and the center frames respectively connected to lower ends of the main frames, and a pair of lower tubes are connected to a lower end of the down tube and branched therefrom so as to extend downward from the branched portions, the extended branched end portions are then bent rearward to further extend in a horizontal direction and connected to respective lower portions of the center frames so as to provide the vehicle body frames as a semi-double cradle structure, and wherein the fuel cell is disposed along the down tube on a rear side thereof and in a space inside the vehicle body frame surrounded by the main frames, the center frames, the down tube and the pair of lower tubes constituting the vehicle body frame, wherein the fuel cell and the fuel tank are disposed such that longitudinal directions thereof are directed vertically of the vehicle body, and in a front view of the vehicle body, the fuel cell tank are overlapped with each other in the longitudinal direction of the vehicle body, and wherein the casing is provided in a vehicle body front side of the fuel cell and the fuel tank in a side view of the vehicle body, and, in a front view of the vehicle body, the casing is configured so that an outside end profile of the casing located at an outermost side in a vehicle body width direction in each of left and right portions of the casing protrudes outward in the vehicle body width direction from both outer side profiles in the vehicle body width direction of the fuel cell and, in a front view of the vehicle body, the casing is overlaid on the fuel cell or the fuel tank.

2. The fuel-cell vehicle of claim 1, wherein the casing is located in front of the fuel cell on a vehicle body front side of the fuel cell.

3. The fuel-cell vehicle of claim 1, wherein the casing has a rear end portion located in front of a rear end portion of the down tube in a longitudinal direction of the vehicle body.

4. The fuel-cell vehicle of claim 1, wherein the casing is configured to have a size for accommodating a controller that controls an operation of at least one of the fuel cell, the tank valve of the fuel tank, and the engine.

5. The fuel-cell vehicle of claim 1, wherein an upper half of the fuel cell is covered by the casing and a lower half of the fuel cell is covered by the pair of lower tubes, wherein the pair of lower tubes have a width between outer side ends in the vehicle width direction that is larger than a width in the vehicle width direction of the fuel cell.

* * * * *